US007274716B2

(12) United States Patent
Hochschild

(10) Patent No.: US 7,274,716 B2
(45) Date of Patent: Sep. 25, 2007

(54) MULTIPLEXED SIGMA-DELTA INTERFACE

(75) Inventor: James R. Hochschild, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1041 days.

(21) Appl. No.: 10/464,022

(22) Filed: Jun. 18, 2003

(65) Prior Publication Data

US 2004/0258103 A1 Dec. 23, 2004

(51) Int. Cl.
*H04J 3/02* (2006.01)
(52) U.S. Cl. .................. 370/538; 370/503; 370/463
(58) Field of Classification Search ........... 370/503, 370/464, 465, 466, 535, 537, 538, 463
See application file for complete search history.

(56) References Cited

U.S. PATENT DOCUMENTS

| | | | |
|---|---|---|---|
| 5,740,519 A * | 4/1998 | Einsel et al. ............... 455/45 |
| 5,886,656 A | 3/1999 | Feste et al. ............... 341/143 |
| 6,400,295 B1 | 6/2002 | Van Herzeele ............. 341/143 |
| 7,016,447 B1 * | 3/2006 | Reuveni ..................... 375/371 |
| 2006/0083393 A1 * | 4/2006 | Richenstein et al. ....... 381/302 |

OTHER PUBLICATIONS

*TLC320AD57C Data Manual, Sigma-Delta Stereo Analog-to-Digital Converter*, SLAS086A, Jan. 1995, Texas Instruments, 20 pages.

* cited by examiner

*Primary Examiner*—Ajit Patel
(74) *Attorney, Agent, or Firm*—Alan K. Stewart; W. James Brady; Frederick J. Telecky, Jr.

(57) ABSTRACT

An improved digital interface circuit that allows a plurality of data streams and other digital information to be output over a single channel. The digital interface circuit includes a plurality of data inputs, at least one control input, at least one clock input, and a single serial bit output. The digital interface circuit receives respective input data streams at the data inputs, receives digital control information at the control input, and receives a clock signal at the clock input. The control information is an N-bit data stream having a data rate of 1/N times the rate of the input data streams ($N \geq 1$). The digital interface circuit generates a frame synchronization signal for providing framing for the N-bit data stream, and time-multiplexes the data and control information over the single serial bit output.

10 Claims, 2 Drawing Sheets

MULTIPLEXED SIGMA-DELTA INTERFACE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present application relates generally to digital interfaces in integrated circuits, and more specifically to a multiplexed single-bit digital interface circuit.

In recent years, advancements in sub-micrometer Integrated Circuit (IC) design and manufacturing technology have led to drastic reductions in the physical size and cost of electronic devices. For example, in the field of audio signal processing, such advancements in IC design and manufacture have made it possible to include Analog-to-Digital Converters (ADCs) and powerful digital signal processing circuitry in a compact low-cost digital microphone device. A conventional digital microphone device typically includes an audio transducer, an analog input interface, an ADC, a clock generator, and a digital output interface. In a typical mode of operation, the audio transducer generates an analog signal representative of an audio input signal, and provides the analog signal to the analog interface, which may include one or more programmable gain amplifier circuits. Next, the analog interface circuit provides the analog signal to the ADC, which may comprise a sigma-delta ADC. The ADC then converts the analog signal into a corresponding digital signal, and provides the digital signal to the digital interface. The clock generator generates suitable clock signals for use by both the ADC and the digital interface. Finally, the digital interface circuit produces a digital output signal, which may then be provided to a user apparatus for subsequent reproduction of the audio input signal.

In today's compact electronic devices such as the conventional digital microphone described above, the functionality of the device must be provided to the user via a simple interface having a minimal number of external connections, terminals, and/or pins. However, this can be problematic in the digital microphone device because the digital microphone is often required to provide a digital output signal in the form of multiple high-speed data streams. Further, because the analog interface of the digital microphone may include programmable gain amplifiers, the digital microphone may also be required to provide gain control information in addition to the high-speed data streams. For this reason, the conventional digital microphone device frequently includes extra external connections, terminals, and/or pins to convey the data and gain control information, which can increase the complexity of the digital interface and thus the overall size and cost of the device.

It would therefore be desirable to have an improved digital interface that avoids the drawbacks of the above-described conventional digital interface circuitry.

BRIEF SUMMARY OF THE INVENTION

In accordance with the present invention, an improved digital interface circuit is provided that allows a plurality of data streams and other digital information to be output over a single channel. Benefits of the presently disclosed digital interface circuit are achieved by time-multiplexing the digital output information onto a single serial bit line.

In one embodiment, the digital interface circuit includes a plurality of data inputs, at least one control input, at least one clock input, and a single serial bit output. The digital interface circuit is configured to receive respective input data streams at the data inputs, to receive digital control information at the control input, and to receive a clock signal at the clock input. In the presently disclosed embodiment, the control information comprises an N-bit data stream having a data rate of 1/N times the rate of the input data streams ($N \geq 1$). The digital interface circuit is further configured to generate at least one frame synchronization signal for providing framing for the N-bit data stream, to combine the input data streams with the control information and the frame synchronization signal, and to provide the combined data and control information over the single serial bit output. In the presently disclosed embodiment, the clock signal runs at twice the rate of the input data streams, and the data and control information is time-multiplexed onto the single serial bit output using both the rising and falling edges of the clock.

By time-multiplexing the data and control information onto the single serial bit output, the digital interface circuit provides a simplified single-bit interface at reduced size and cost.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

An improved digital interface circuit is disclosed that allows a plurality of data streams and other digital information to be output over a single channel. The presently disclosed digital interface circuit time-multiplexes the digital output information onto a single serial bit line.

Figure 1:
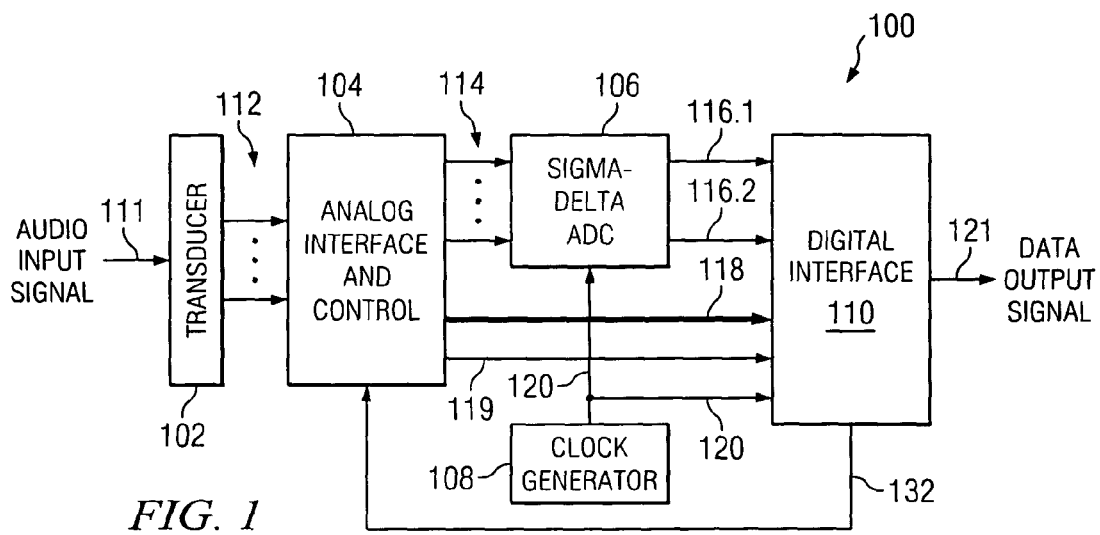
FIG. 1 is a block diagram of a digital microphone device including a digital interface circuit according to the present invention.

FIG. 1 depicts an illustrative embodiment of a digital microphone device 100 including a digital interface circuit 110, in accordance with the present invention. In the illustrated embodiment, the digital microphone device 100 includes an audio transducer 102, an analog interface/gain control circuit 104, an Analog-to-Digital Converter (ADC) 106, a clock generator 108, and the digital interface circuit 110. It should be understood that the digital interface circuit 110 is not limited to use in the digital microphone device 100, and that the digital interface circuit 110 may be employed in conjunction with other suitable circuits and devices. The digital interface circuit 110 is depicted in FIG. 1 as part of the digital microphone device 100 for purposes of illustration.

As shown in FIG. 1, the audio transducer 102 receives an audio input signal over a line 111, generates an analog signal representative of the audio input signal, and provides the analog signal to the analog interface/gain control circuit 104 over one or more lines 112. In the presently disclosed embodiment, the analog interface/gain control circuit 104 includes a plurality of Programmable Gain Amplifiers (PGAs, not shown), in which each PGA includes suitable Automatic Gain Control (AGC) circuitry for controlling the amplification level produced by the PGA based on the current sound level. The analog interface/gain control circuit 104 provides the amplified analog signal to the ADC 106 over one or more lines 114. The analog interface/gain control circuit 104 further provides gain control information and other related control information to the digital interface circuit 110 over lines 118-119, respectively. The clock generator 108 provides a clock signal to the ADC 106 and the digital interface circuit 110 over lines 120.

Moreover, the digital interface circuit 110 provides an internally generated clock signal to the analog interface/gain control circuit 104 over a line 132. It is noted that this clock signal corresponds to the C160 clock signal provided over the line 332 at the output of an inverter 330, as depicted in a schematic representation 310 (see FIG. 3) of the digital interface circuit 110. The C160 clock signal clocks the AGC circuitry within the analog interface/gain control circuit 104, which in turn controls the gain of the PGAs. In this way, the PGA gain changes are synchronized with the operation of the digital interface circuit 110.

In the preferred embodiment, the ADC 106 comprises a sigma-delta ADC or any other suitable low-cost ADC. The sigma-delta ADC 106 receives the amplified analog signal from the analog interface/gain control circuit 104, converts the analog signal into a corresponding digital signal, and provides the digital signal to the digital interface circuit 110 over one or more lines 116.1-116.2. The digital interface circuit 110 then provides a data output signal over a line 121, which may be connected to user apparatus (not shown) for subsequently reproducing the audio input signal.

In the presently disclosed embodiment, the digital signal provided to the digital interface circuit 110 by the sigma-delta ADC 106 comprises a plurality of high-speed data streams AD1-AD2. Specifically, the sigma-delta ADC 106 provides the high-speed data streams AD1-AD2 to the digital interface circuit 110 over the lines 116.1-116.2, respectively. Further, the gain control and other related control information provided to the digital interface circuit 110 by the analog interface/gain control circuit 104 comprises at least one control stream and at least one control signal. Specifically, the analog interface/gain control circuit 104 provides a low-speed gain control stream "Gain" to the digital interface circuit 110 over the lines 118, and a gain update control signal "U" to the digital interface circuit 110 over the line 119.

The illustrative embodiment disclosed herein will be better understood with reference to the following example, in which the digital interface circuit 110 (see FIG. 1) is configured as a double-sampled, double-pumped digital interface having four channels to accommodate the high-speed data streams AD1-AD2, the low-speed gain control stream "Gain" including the gain update control signal "U", and an internally generated frame synchronization signal "Sync". In this example, the clock signal generated by the clock generator 108 has a frequency of about 2.56 MHz. Further, the sigma-delta ADC 106 is a 2-stage sigma-delta ADC, and the AD1-AD2 data streams provided by the sigma-delta ADC 106 over the lines 116.1-116.2 represent outputs of the first and second stages, respectively, of the ADC 106. Each of the AD1-AD2 data streams has a data rate of about 1.28 MHz, which is one half the frequency of the clock signal.

Moreover, the Gain control stream and the U update control signal provided by the analog interface/gain control circuit over the lines 118-119, respectively, comprise an N-bit control stream representing the current gain state of the PGAs (N≧1). The analog interface/gain control circuit 104 provides this N-bit control stream at a data rate of 1/N times the data rate of the AD1-AD2 data streams, and the Sync signal provides framing for the N-bit control stream. The digital interface circuit 110 is configured to combine the AD1-AD2 data streams, the Gain control stream, the U update control signal, and the Sync signal, and to provide the combined data and control information as the data output signal over the line 121, which comprises a single serial bit line.

For example, in the event N=8, the data rate of the 8-bit control output is about (⅛) (1.28 MHz) or 160 kHz. TABLE 1 below shows illustrative values for the 8-bit AD1-AD2 data streams, the 7-bit G0-G6 Gain control stream and the 1-bit U update control signal, and the Sync signal for the 8-bit control frame.

TABLE 1

| AD1 | 0/1 | 0/1 | 0/1 | 0/1 | 0/1 | 0/1 | 0/1 | 0/1 |
|------|-----|-----|-----|-----|-----|-----|-----|-----|
| AD2 | 0/1 | 0/1 | 0/1 | 0/1 | 0/1 | 0/1 | 0/1 | 0/1 |
| Gain | U | G6 | G5 | G4 | G3 | G2 | G1 | G0 |
| Sync | 0 | 0 | 0 | 0 | 0 | 0 | 0 | 1 |

In this example, the G0-G6 Gain control stream (see TABLE 1) is the 7-bit output of the current gain state of the PGAs included in the analog interface/gain control circuit 104. Further, each new update of the 7-bit gain state is indicated by setting U to a predetermined logical value.

The purpose of the 1-bit U update control signal is to reduce power by causing the digital interface circuit 110 to send gain information only when the gain changes.

In the presently disclosed embodiment, if the gain has not changed since the previous frame (e.g., if the current gain control stream matches that of the previous frame), then all of the gain bits G0-G6 are forced to logical low values (i.e., zeros). This saves power by reducing the amount of toggling of the digital output signal when the gain is not changing. This behavior is controlled by a CONT_GAIN control signal at the inputs of an inverter 319 and an OR gate 318 (see FIG. 3), which also receives the U update control signal ("UPDATE"). In the event CONT_GAIN=1, the gain information is transmitted with each successive frame and no power is saved. In the event CONT_GAIN=0, either the gain is transmitted when it has changed or all zeros are transmitted when the gain has not changed, thereby reducing power at the digital interface. The 1-bit UPDATE control signal provides notification of a gain change. It is noted that the digital interface circuit 110 indicates each new 8-bit control frame by setting the value of the Sync signal to the logical 1 value.

Figure 2:
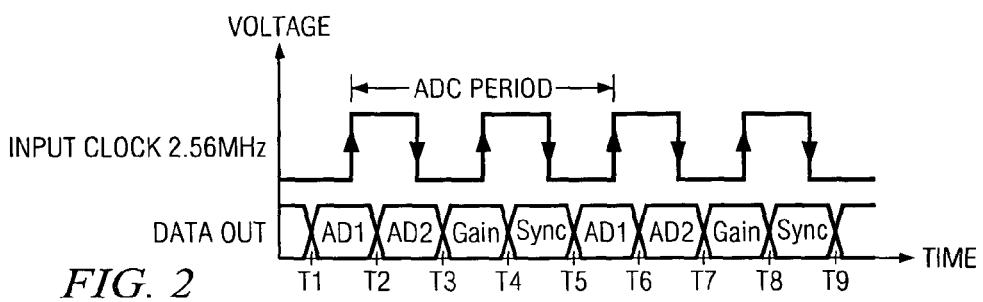
FIG. 2 is a timing diagram illustrating a clock signal employed by the digital interface circuit of FIG. 1 and a time-multiplexed data output signal provided by the digital interface.

FIG. 2 depicts representations of the clock signal ("Input clock") provided by the clock generator 108 over the lines 120 (see FIG. 1), and the data output signal ("Data out") provided by the digital interface circuit 110 over the single serial bit line 121 (see FIG. 1). The frequency of the Input clock is about 2.56 MHz. Further, the AD1-AD2 data streams, the Gain control stream, the U update control signal, and the Sync signal are combined by time-multiplexing this Data out information over the line 121. In the example described above, each of the AD1-AD2 data streams has a data rate of about 1.28 MHz. Accordingly, the ADC period is equal to about twice the period of the 2.56 MHz clock signal.

As shown in FIG. 2, the Data out signal includes respective bits from the AD1 data stream, the AD2 data stream, the Gain control stream, and the Sync signal during time intervals $T_1$-$T_2$, $T_2$-$T_3$, $T_3$-$T_4$, and $T_4$-$T_5$, respectively. Further, this sequence of data and control information repeats during subsequent corresponding time intervals. In the presently disclosed embodiment, the Input clock runs at about twice the rate of the input data streams applied to the digital interface circuit 110 over the lines 116.1-116.2 (see FIG. 1), i.e., the Input clock has a frequency of about 2.56 MHz and each of the AD1-AD2 data streams has a data rate of about 1.28 MHz. The data and control information AD1, AD2, Gain, and Sync can therefore be time-multiplexed over the line 121 using both the rising and falling edges of the Input clock.

For example, as indicated in FIG. 2, the AD1 and the Gain channels of the Data out signal coincide with the rising edges of the Input clock, and the AD2 and the Sync channels of the Data out signal coincide with the falling edges of the Input clock. In the illustrated embodiment, the Sync signal is employed to differentiate between the Sync channel and the AD2 channel, which share the falling edges of the Input clock, to acquire and maintain synchronization. As described above, the sigma-delta ADC 106 is a 2-stage sigma-delta ADC, and the AD1-AD2 data streams provided by the 2-stage sigma-delta ADC 106 represent the outputs of the first and second stages, respectively. Those of ordinary skill in the art will appreciate that the output of the second stage of the 2-stage sigma-delta ADC (e.g., the AD2 channel) consists of highly random high frequency quantization noise. This quantization noise on the AD2 channel is relatively easy to distinguish from the signal on the Sync channel, which normally consists of a regular bit pattern.

Figure 3:
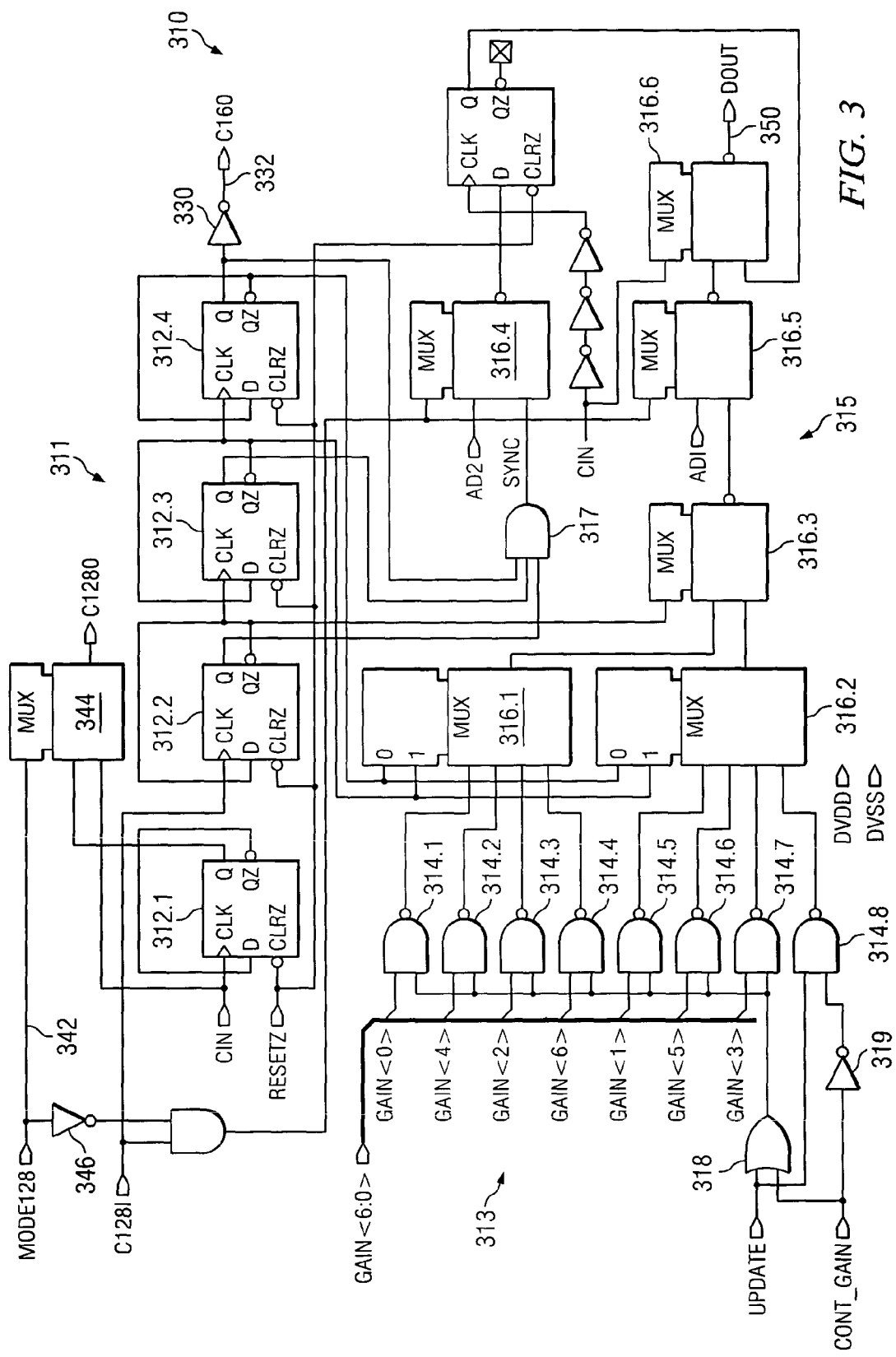
FIG. 3 is a schematic diagram of the digital interface circuit of FIG. 1.

FIG. 3 depicts the schematic representation 310 of the digital interface circuit 110 (see FIG. 1). As shown in FIG. 3, the digital interface circuit 310 includes an input stage 313, an output stage 315, and a timing signal generator 311. The input stage 313 is configured to receive the AD1-AD2 data streams at multiplexors 316.5 and 316.4, respectively, the Gain control information ("GAIN<6:0>") at NAND gates 314.1-314.7, the UPDATE control signal at the OR gate 318, and the Input clock ("CIN") at a Flip-Flop (FF) 312.1. The input stage 313 includes a bank of NAND gates 314.1-314.8 for receiving the current GAIN<6:0> information and the UPDATE signal, and for providing either the current GAIN<6:0> information or all zeros to multiplexors 316.1-316.2. The timing signal generator 311 comprises a counter 312 including Flip-Flops (FFs) 312.1-312.4 configured to generate timing signals for controlling the operation of multiplexors 316.1-316.2, to generate the Sync signal ("SYNC") in conjunction with an AND gate 317, and to generate the C160 clock signal in conjunction with the inverter 330. The output stage 315 includes the multiplexors 316.1-316.6, which are configured to time-multiplex the AD1-AD2 data streams, the GAIN<6:0> information and the UPDATE signal, and the SYNC signal to produce the Data out signal ("DOUT") at the output of the multiplexor 316.6.

It is noted that the digital interface circuit 310 receives a MODE128 control signal at the control input of a multiplexor 344 and at the input of an inverter 346 over a line 342. In the presently disclosed embodiment, the MODE128 control signal controls the digital interface circuit 310 as follows. In the event MODE128=1, the input clock ("CIN") has a frequency equal to the ADC sample frequency and only the AD1 and AD2 information is transmitted over the line 350 ("DOUT") on opposing edges of the clock. This is a simplified mode of operation that is employed when the user does not need the PGA gain information. In the event MODE128=0, the frequency of the CIN input clock is twice the ADC sample frequency, and all four channels (i.e., AD1, AD2, GAIN, and SYNC) are transmitted over the DOUT line 350.

Figure 4:
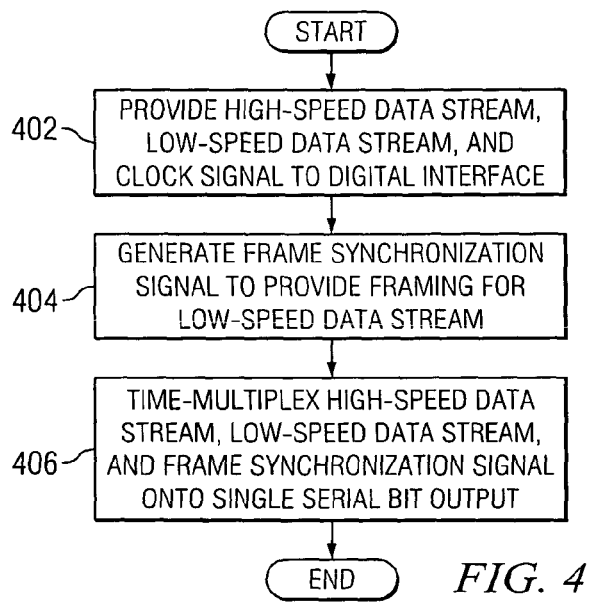
FIG. 4 is a flow diagram of a method of operating the digital interface circuit of FIG. 1.

A method of operating the presently disclosed digital interface circuit is illustrated by reference to FIG. 4. As depicted in step 402, at least one high-speed data stream, at least one low-speed N-bit data stream (N≧1), and at least one clock signal are provided to the digital interface circuit. The N-bit data stream has a data rate equal to 1/N times the rate of the high-speed data stream. Further, the clock signal has a clock rate equal to two times the high-speed data rate. A frame synchronization signal is then generated, as depicted in step 404, by the digital interface circuit to provide framing for the N-bit data stream. Finally, the high-speed data stream, the low-speed data stream, and the frame synchronization signal are time-multiplexed, as depicted in step 406, onto a single serial bit output by the digital interface circuit. In this way, the presently disclosed digital interface circuit allows one or more 1-bit sigma-delta high-speed data streams and a multi-bit low-speed data stream (e.g., the PGA gain information) to be multiplexed onto a single channel with framing information.

It will further be appreciated by those of ordinary skill in the art that modifications to and variations of the above-described multiplexed sigma-delta interface may be made without departing from the inventive concepts disclosed herein. Accordingly, the invention should not be viewed as limited except as by the scope and spirit of the appended claims.

What is claimed is:

1. A digital interface for an integrated circuit, comprising:
an input stage configured to receive at least one first data stream having an associated first data rate, to receive at least one second data stream having an associated second data rate, and to receive at least one clock signal having an associated clock frequency;
an output stage configured to time multiplex the first and second data streams onto a serial bit output line; and
a timing signal generator configured to receive the clock signal generated by the input stage, to generate timing signals for controlling at least the output stage, and to generate at least one synchronization signal to provide framing for the second data stream.

2. The digital interface of claim 1 wherein the output stage is further configured to time multiplex the first and second data streams and the synchronization signal onto the serial bit output line.

3. The digital interface of claim 1 wherein the second data stream is an N-bit data stream and the second data rate is about 1/N times the first data rate, N≧1.

4. The digital interface of claim 1 wherein the clock frequency is about two times the first data rate.

5. The digital interface of claim 1 wherein at least one of the first and second data streams comprises a plurality of successive N-bit data streams, and wherein the input stage is further configured to determine whether a first one of the plurality of successive N-bit data streams matches a previous one of the successive N-bit data streams, and in the event the first N-bit data stream matches the previous N-bit data stream, to set each bit of the first N-bit data stream to a predetermined logical value.

6. A method of operating a digital interface for an integrated circuit, comprising the steps of:

receiving at least one first data stream having an associated first data rate, at least one second data stream having an associated second data rate, and at least one clock signal having an associated clock frequency by an input stage;

providing the clock signal to a timing signal generator by the input stage;

generating timing signals in response to the clock signal generated by the input stage for controlling at least an output stage and generating at least one synchronization signal to provide framing for the second data stream by the timing signal generator; and time multiplexing the first and second data streams onto a serial bit output line by the output stage.

7. The method of claim 6 wherein the multiplexing step includes time multiplexing the first and second data streams and the synchronization signal onto the serial bit output line by the output stage.

8. The method of claim 6 wherein the receiving step includes receiving the first data stream having the associated first data rate and the second data stream having the associated second data rate, wherein the second data stream is an N-bit data stream and the second data rate is 1/N times the first data rate, $N \geq 1$.

9. The method of claim 6 wherein the receiving step includes receiving the first data stream having the associated first data rate and the clock signal having the associated clock frequency, wherein the clock frequency is two times the first data rate.

10. The method of claim 6 wherein at least one of the first and second data streams comprises a plurality of successive N-bit data streams, and further including the steps of determining whether a first one of the plurality of successive N-bit data streams matches a previous one of the successive N-bit data streams, and in the event the first N-bit data stream matches the previous N-bit data stream, setting each bit of the first N-bit data stream to a predetermined logical value.

* * * * *